June 17, 1952　　　　J. H. DE FREES　　　　2,600,977
EMERGENCY VALVE SYSTEM
Filed Oct. 13, 1948　　　　　　　　　　　　3 Sheets-Sheet 1
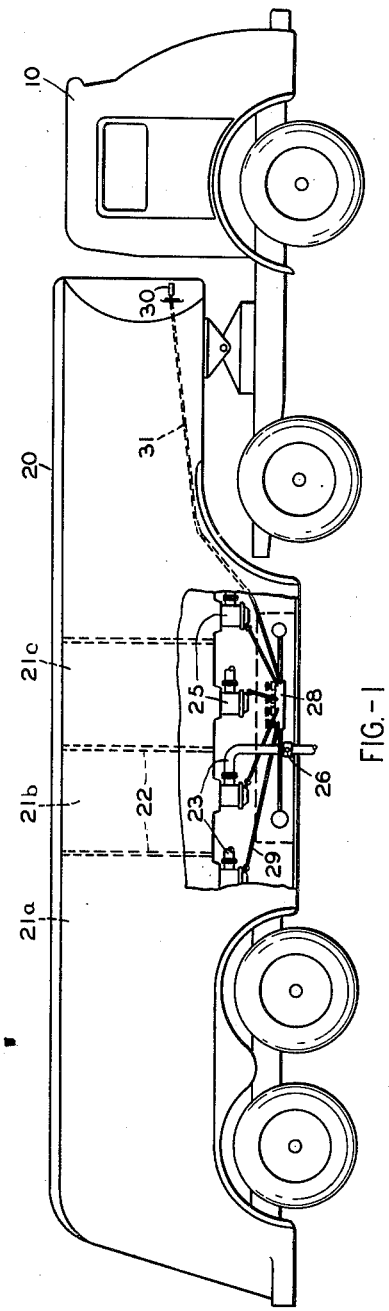
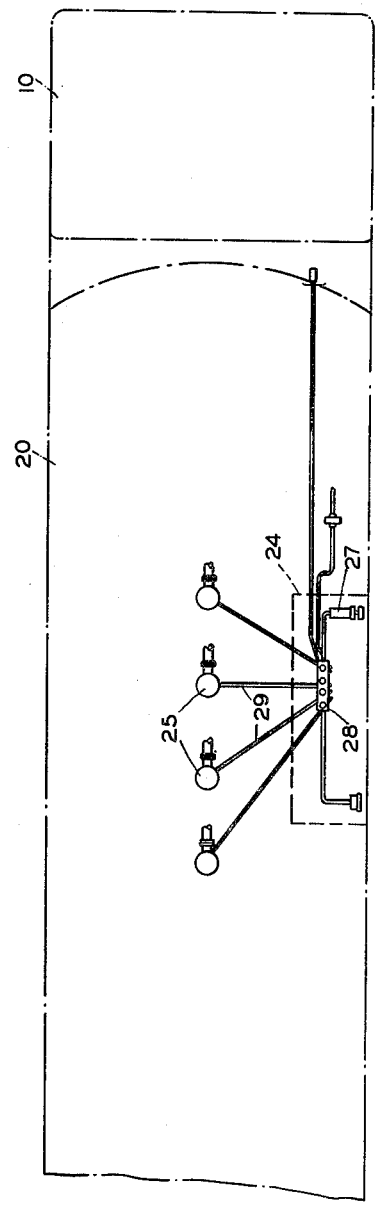
INVENTOR.
JOSEPH H. DeFREES
BY
Hyde, Meyer, Baldwin & Doran
ATTORNEYS

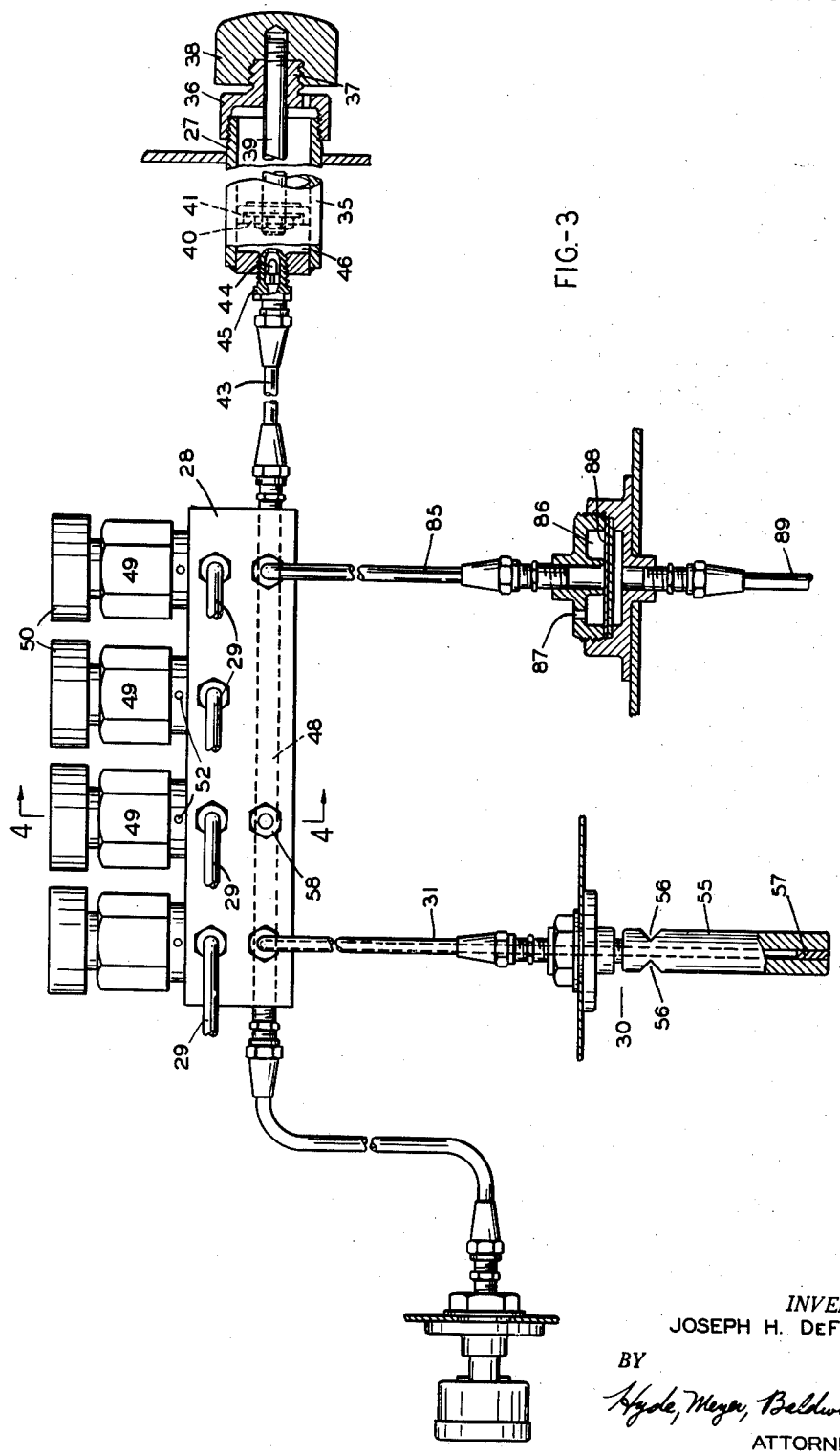

June 17, 1952  J. H. DE FREES  2,600,977
EMERGENCY VALVE SYSTEM
Filed Oct. 13, 1948  3 Sheets-Sheet 3

*INVENTOR.*
JOSEPH H. DeFREES
BY
Hyde, Meyer, Baldwin & Doran
ATTORNEYS

Patented June 17, 1952

2,600,977

UNITED STATES PATENT OFFICE 2,600,977

EMERGENCY VALVE SYSTEM

Joseph H. De Frees, Warren, Pa.

Application October 13, 1948, Serial No. 54,336

6 Claims. (Cl. 222—52)

The invention relates to liquid discharge control means comprising novel and improved emergency valves and valve operating systems. The present application is a continuation in part of my copending application for patent, Serial Number 706,162, filed October 28, 1946, now abandoned. The valves and systems disclosed herein and in said co-pending application are particularly adapted for use in connection with storage or transportation tanks for explosive or inflammable liquids such as gasoline or the like.

As is well-known to those skilled in the art, such liquids are often carried or stored in multi-chambered tanks, each chamber usually having an individual discharge outlet and a valve control therefor. If the outlet connections are damaged by accident or otherwise, discharge of the contents may result in a disastrous fire with possible personal injury to the attendant, truck driver, or others in the vicinity. In any event such damage to the discharge means probably results in substantial property and oil loss. Various emergency valve structures have heretofore been devised to prevent discharge of the liquid except when the operator is in active control of the discharge.

For such purpose, in addition to the manually controllable valve provided at the usual discharge outlet for each compartment, there is provided, in liquid flow sequence therewith, an additional valve commonly termed an emergency valve, at a relatively inaccessible position in the tank bottom wall so as to be invulnerable to normal injury or shock. The emergency valve thus provided is normally closed so that fluid conduits and connections external thereto may suffer damage without liquid discharge from the tank.

From what has been said so far, it will be apparent that two operations are normally performed by an attendant in order to effect liquid discharge from a storage or transportation tank equipped with emergency valve safety means. Each such tank, or each individual compartment of a multi-chambered tank, is provided with liquid discharge passage means having therein two valves in sequence, namely the usual flow control valve near the outlet end of such passage, and an emergency valve near the tank end of the passage. The order of operating such valves to procure external liquid discharge is not significant, except that both valves must be opened to secure such discharge. It is of course feasible, in the case of a multi-chambered tank, to carry the discharge passages from all the emergency valves to a common outlet manifold, from which manifold further flow may be manually controlled by a single common valve. Normally the emergency valves are biased, by spring or otherwise, to closed position, and power expenditure under the control of the attendant is required to open the emergency valve.

In the past, certain emergency valves have been operated by hydraulic pressure using oil as the power fluid. Such systems have distinct disadvantages not encountered with the present invention. Oil is relatively sluggish and evacuation of oil from a power reservoir or pressure head is relatively slow in case of emergency. This is especially true when the temperature is low. Oil leakage or loss must be combated by carefully packed joints. Further, in a hydraulic system powered by oil the moving elements do not have the desirable or required freedom of action, sluggish movement of the parts being a natural result of the oil viscosity, as above noted. Thus the oil content, and the condition of the packing must be frequently checked. In addition control valves for the oil are expensive and complicated since the fluid must be returned to the reservoir. If air pockets develop in the system they can be eliminated only with difficulty, and the oil supply must be carefully checked and periodically replenished because of leaks.

Recognizing the disadvantages of oil powered systems, attempts heretofore have been made to adapt compressed air to the operation of an emergency valve of the general character and function herein described. Such attempts have relied on the use of compressed air tapped from a reservoir which also supplies fluid power for the vehicle air brakes. A system of this type has a number of disadvantages, including the following: the air power so secured is not freely expendable, since operation of the emergency valves reduces the pressure available for the brakes. Even when brake reservoir air pressure is maintained by an automatic pump, and further by an automatic valve operating on the minimum pressure principle and feeding the emergency valve only when the brake pressure is above the minimum, the regulating valve may fail and exhaust the brake reservoir, rendering braking inoperative. Emergency valves which utilize air from the air brake system require quite complicated control valves and regulators. Such precautionary measures increase the cost and complexity of the installation. It will be immediately apparent that the consequences might be disastrous if any of the above features contributed to render the air brakes inoperative by reason of sudden failure or lowering of air pressure. The present invention, therefore, does not rely on air power from the air brake system, and as a matter of fact my invention can be used equally as well with trucks which are not equipped with conventional air brakes at all.

In other emergency valve control systems heretofore available in the art, the valves have been opened by mechanical linkages requiring substantial physical effort by the operator, and accompanied by disadvantages such as exposed working parts, frayed cables, rusted moving elements, etc., all contributing to difficulties in valve operation.

An object of the present invention therefore is to provide novel and improved liquid discharge control structures adapted to be operated by expendable air, replenishable only manually, and consequently adapted for extremely rapid valve closing operation in times of emergency or stress.

A further object is to provide an emergency valve operating system including a novel valve and valve operating means particularly adapted for the utilization of compressed air as the valve operating agent, and affording a high degree of flexibility with respect to the arrangement and disposal of the various emergency control elements.

A further object of the invention is to provide a system as specified in the last preceding paragraph, and wherein the emergency valve cannot be opened until the air brakes are set, thereby insuring liquid flow only when the vehicle is stopped and under control, but wherein the air supply to operate the valves is not tapped from the brake fluid power reservoir.

A further object is to provide novel and improved manually operatable means for rapidly developing an adequate air pressure for the valve opening operations, in combination with means for substantially instantaneously discharging said compressed air when conditions are encountered which require immediate closing of any open emergency valves.

A further object is to provide, in combination, novel and improved emergency valve means, valve operating means, air pressure developing and supply means, and emergency air discharge means, all cooperating to provide a simple and efficient emergency valve system.

Other objects and advantages will be apparent from a study of the following specification, in conjunction with the accompanying drawings, in which:

Fig. 1 is a schematic showing in side elevation of a liquid transportation vehicle equipped with emergency valves and a valve operating system embodying my invention;

Fig. 2 likewise is a schematic showing, in top plan view, of the vehicle and system shown in Fig. 1;

Fig. 3 is a view in side elevation of an air pump, a distributing manifold, and auxiliary elements for generating, supplying and controlling air power for the emergency valves, parts being broken away and in section to reveal internal structure;

Figure 5:
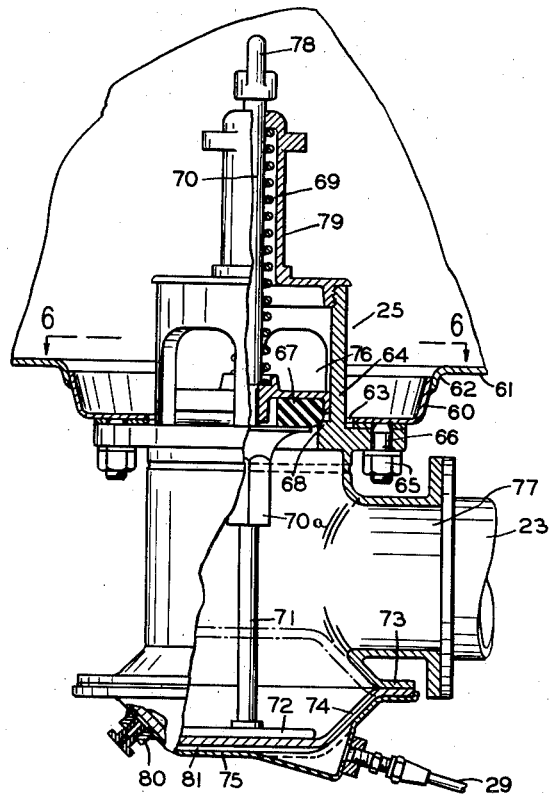
Fig. 5 is a view, partly in vertical section and partly in side elevation, showing the specific construction of one embodiment of my emergency valve.

As will more particularly appear hereinafter, my invention comprises novel and improved means for furnishing compressed air power, and for distributing such power to the particular emergency valve to be operated. It further comprises a valve operating system including normally closed valves which are opened only by intentional selection by the attendant. It finally comprises means for substantially instantaneously exhausting the motive fluid so as to effect immediate valve closing under certain emergency conditions such as will be hereinafter discussed.

Figs. 1 and 2 schematically show the general location and operating relationship of the various cooperating elements of my emergency valve system. The drawings show in conventional outline a power tractor or truck 10, and a trailer 20, the trailer having a plurality of compartments 21a, 21b, 21c, etc., the compartments being separated by transverse partitions 22. From the lowest portion of each compartment a discharge pipe 23 extends to an outlet control cabinet 24 shown in the present drawings in dotted line outline. The cabinet may be supported in any convenient location on the trailer body or chassis, and is here shown at the right side of the trailer intermediate its front and rear ends. The control cabinet may be, and sometimes is, located at the rear end of the vehicle, it being understood that the location thereof is of no significance with respect to the construction and operation of the invention as here disclosed.

Figure 6:
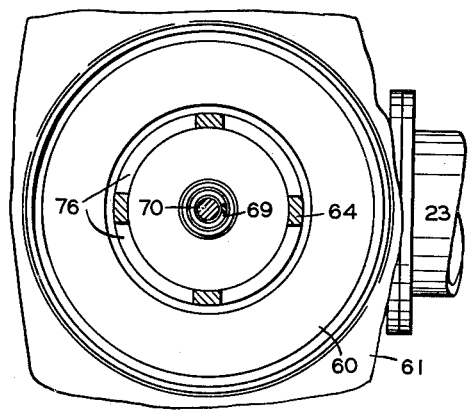
Fig. 6 is a sectional view taken on the line 6—6 of Fig. 5.

One of my improved emergency valves 25, together with a servomotor operator therefor, is located at the point of communication of each compartment with its respective discharge pipe, the construction of such valve being later described in detail in connection with Figs. 5 and 6. A conventional manually operatable valve 26 for each discharge pipe is located within the cabinet 24, one such valve being indicated in Fig. 1. Likewise located within cabinet 24 is a fluid power mechanism comprising a pump 27 and distributing manifold 28 adapted for manual operation, the construction being later more fully described in connection with Fig. 3. Between the manifold 28 and each emergency valve 25 is a power fluid supply pipe 29 which furnishes an amount of fluid power, such as compressed air, capable of overcoming valve closing bias, so as to open said valves when desired by the attendant. One or more remote control devices 30 is in operative communication with the fluid storage chamber of the valve operator through conduits 31, each remote control device being provided with means to exhaust the air manifold in case rapid valve closing is desired when the valve control cabinet is not readily accessible, for example, when there is a fire in or near the cabinet.

In using the system hereinabove briefly outlined, when normal discharge of one or more compartments is desired, the attendant opens cabinet 24 and by a simple manual pumping operation develops adequate air pressure in manifold 28 by means of a pump 27. The pressure thus developed is transmitted to any selected servomotor, there being one servomotor operatively associated with each emergency valve. The servomotor opens the valve against spring bias, permitting liquid discharge. When discharge has proceeded to the required point, the servomotor or servomotors may be instantaneously vented to atmosphere by a control incorporated in the operator, thereby producing instant closure of the emergency valve. If a valve has been opened as described, but the normal venting control is inaccessible, for example in case of fire adjacent to or in the operating cabinet 24, the attendant may use the remote control 30 to exhaust the entire air supply in manifold 28 and associated piping. This feature will be described in greater detail hereinafter. The advantages of using expendable air is immediately apparent from a consideration of the various operations above outlined, and now to be more fully disclosed in connection with a more detailed description of the various elements.

The air pump heretofore generally indicated by reference character 27 in Fig. 1, will now be described, special reference being had to Fig. 3.

The pump comprises a cylinder 35 having at one end thereof a screw cap 36 provided with a central bored boss 37 exteriorly threaded to receive a manipulating cap 38. Extending inwardly from the cap is a piston rod 39 carrying at its inner end a piston 40 provided with a cupped packing 41. It will be apparent that when the pump is not in use the cap 38 can be pushed inwardly and given several clockwise turns to secure it to boss 37. When air is needed for the valve system the cap is given several counterclockwise turns to release it from boss 37, after which the piston is manually reciprocated in familiar fashion to develop the necessary air pressure through pipe 43 into manifold 28. A conventional check valve 44 is placed in the fitting 45 at the outlet of compression head 46. A few strokes of the piston is sufficient to provide air pressure adequate to open a valve when communication is established between pump and emergency valve as will soon be described.

It is intended that this operation be performed each time it is desired to open a valve. The pump 27 and manifold 28 are fixed in position in the control cabinet 24.

Figure 4:
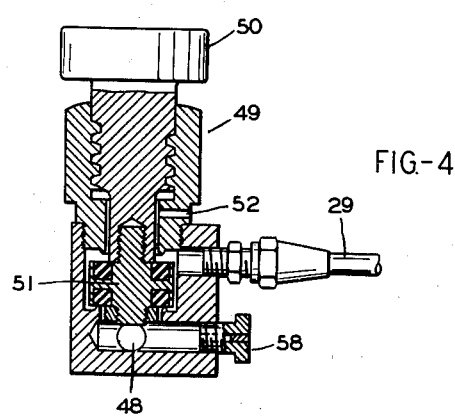
Fig. 4 is a sectional view taken on the line 4—4 of Fig. 3.

Manifold 28 serves as a pressure header, and distribution system for fluid power to any emergency valve selected by the operator. It comprises a longitudinal passage 48 through which access is had to any pipe 29 under the control of a respective three-way valve 49 (Figs. 3 and 4). A turn of the valve control knob 50 raises or lowers the double seated valve head 51. In its lower position (Fig. 4) it permits exhaust from pipe 29 through vent 52. In its upper position it seals the exhaust, and permits passage of fluid power from passage 48 to pipe 29.

As previously mentioned, there may be one or more emergency valve closing devices 30 mounted at spaced points on the trailer body, one such device being shown in Fig. 1 as adjacent the driver's seat, and being also illustrated in enlarged form in Fig. 3. As shown, the pipe 31 is in communication with a bored safety plug 55 which is notched at 56 to make it readily frangible by a sharp blow of the hand so as to exhaust the air from the system in case of fire or other emergency, when the control cabinet 24 cannot be reached. The plug bore is sealed at its end by a low melting point material 57 which will melt out and exhaust the air in case of fire if the operator is incapacitated, or is driven from his cab by fire. A similar safety plug or outlet 58 is shown in the side of manifold 28, and it may if desired be provided with the frangible feature described above.

The fluid power development, distribution, and control have now been described. My novel emergency valve structure used in such system is shown in Figs. 5 and 6.

Referring to said figures, each emergency valve is carried in a dished drain pocket 60 fixedly supported in an aperture in the bottom wall 61 of the tank compartment, said wall having a downturned annular flange 62 defining the aperture within which the drain pocket is fitted and welded.

The drain pocket is provided with a central aperture 63 adapted to receive the upper end of a cast valve housing 64. The valve housing is held in place by nuts 65 on studs 66 which are welded to the drain pocket. The specific valve construction is described and claimed in a copending application, Serial No. 54,335, filed concurrently herewith, now Patent No. 2,589,346, issued March 18, 1952. It will be sufficient to say here that the valve is of the internal poppet type having a circular head 67 seating downwardly on an annular seat 68 within the valve housing, the valve being biased to its seat by a spring 69 surrounding the valve stem 70.

The valve opening servomotor mechanism is supported within a tubular chamber forming the lower portion of the valve housing. An outturned flange 73 on the lower end of the housing backs up the peripheral edge of an imperforate flexible diaphragm 74 said peripheral edge being clamped between flange 73 and a pressure head 75. Air pressure from the manifold 28 is transmitted to the pressure head by piping 29 as previously described and admission of pressure to the chamber 81 within the pressure head raises the diaphragm from the full line position of Fig. 5 to the dotted line position.

Transmission of movement from the diaphragm 74 to the valve is effected as follows:

The valve stem 70 has a portion 70a projecting downwardly beyond the valve head. This downward projection telescopingly engages a push rod 71 extending upwardly from a flat base 72 which rests on the diaphragm 74. It is apparent that upward motion of the diaphragm raises the push rod and unseats the valve head, thereby permitting downward flow of liquid from the tank compartment through ports 76 in the housing 64, and downwardly past valve head 67 whence it is discharged through nozzle 77 and discharge conduit 23. A bail 78 is fixed to the top of valve stem 70 above bonnet 79 and may be used for manual operation of the emergency valve, for example by a workman in the tank interior, or by reaching through the upper manhole, if the occasion should arise. A fusible plug 80 is fixed in the pressure head 75 so as to exhaust the air chamber 81 if excessive heat develops in the neighborhood of the emergency valve.

It will be noted that when liquid discharge is taking place, the diaphragm is raised sufficiently to insure complete liquid drainage from the housing through the nozzle. Trapped pockets or pools of liquid are thereby avoided, eliminating future contamination and possible fire hazard.

The valve system here disclosed makes use of expendable air non-replenishable except manually, which is quickly and easily brought up to operating pressure, and is immediately exhausted to atmosphere when valve closure is called for. There is no need to worry about air leakage, since the air is replaceable by a stroke or two of the pump as needed. There is no drain on any other air reservoir needed for other accessories or equipment. As far as is known to me the use of expendable compressed air, non-replenishable except manually, in an individual emergency valve system is entirely novel.

In Fig. 3, I have shown an additional advantageous feature which may be used with trucks equipped with air brakes, and which permits the opening of any emergency valve only when the air brakes are set. Pipe 85 is in direct communication at one end with manifold chamber 48, and at the other end with a valve chamber 86. A vent opening 87 permits escape of fluid pressure in line 85 to escape to atmosphere by downwardly unseating the flexible diaphragm 88. A pipe 89 is in communication with the air brake system, so that when the brakes are set diaphragm 88 is pressed upwardly, as shown, cutting off communication between pipe 85 and the exhaust vent 87. Therefore, when the air brakes are set, and then only, pressure can be developed in manifold 28 by pump 27, to permit opening of any of the emergency valves. Conversely, when the driver releases the air brakes, and the truck gets under way, the manifold automatically vents itself, and no emergency valve can be opened until the truck again stops, and the operator again works the pump.

What I claim is:

1. Liquid discharge control means for a liquid storage tank provided with a compartment having an outlet port, said discharge control means comprising an emergency valve operatively associated with said port and being normally biased to closed position whereby discharge from said compartment is normally prevented, servomotor valve operating means associated with said emergency valve and responsive to air pressure, for overcoming said normal valve closing bias, an air pressure source comprising a manually operatable air pump, compressed air flow transmission means for transmitting compressed air directly from said pump to said servomotor, emergency ventable means in said transmission means for venting said compressed air pressure to atmosphere, manually controllable valve means in said transmission means for controlling air flow therethrough whereby to cause normal opening and closing of said emergency valve, said air flow transmission means between said pump and said manually controllable valve means consisting solely of piping of small volumetric capacity whereby venting of said compressed air to atmosphere occurs immediately when said emergency venting means becomes operative.

2. Liquid discharge control means as defined in claim 1, and wherein there is provided fluid flow control means in communication with said air flow transmission means, but relatively remote therefrom, and accessible to an attendant, for immediately venting the compressed air to atmosphere whereby said emergency valve is immediately biased to closed position.

3. Liquid discharge control means as defined in claim 1, and wherein there is provided fluid flow vent means in communication with said air flow transmission means, and responsive to abnormal temperature conditions for immediately venting the compressed air to atmosphere whereby, upon development of a dangerous temperature rise, said emergency valve is immediately biased to closed position.

4. Liquid discharge control means for a liquid storage tank provided with a plurality of compartments, each having an outlet port, said means comprising a plurality of emergency valves each operatively associated with a respective port, and being normally biased to closed position whereby discharge from any said compartment is normally prevented, a plurality of valve-operating servomotors associated one respectively with each emergency valve, and responsive to air pressure for overcoming said normal valve-closing bias, an air pressure distributing manifold, emergency ventable means in communication with said manifold for venting said air pressure to atmosphere, each such servomotor having an individual air flow conduit to said manifold, a manually controllable valve for each said conduit whereby to permit air flow from said manifold to said valve, an air pressure source comprising a manually operatable air pump, air flow transmission means directly between said pump and said manifold, said transmission means consisting solely of piping of small volumetric capacity whereby venting of said air pressure to atmosphere occurs immediately when said emergency venting means becomes operative.

5. Liquid discharge control means as defined in claim 4, and wherein there is provided fluid flow control means in communication with said manifold, but relatively remote therefrom, and accessible to an attendant, for immediately venting the compressed air to atmosphere whereby when any emergency valve is open, said emergency valve is immediately biased to closed position.

6. Liquid discharge control means as defined in claim 4, and wherein there is provided fluid flow vent means in communication with said manifold, and responsive to abnormal temperature conditions for immediately venting the compressed air to atmosphere whereby, upon development of a dangerous temperature rise, when any emergency valve is open, said emergency valve is immediately biased to closed position.

JOSEPH H. DE FREES.

REFERENCES CITED

The following references are of record in the file of this patent:

UNITED STATES PATENTS

| Number | Name | Date |
| --- | --- | --- |
| 1,707,566 | Perkins | Apr. 2, 1929 |
| 1,801,749 | McEachern | Apr. 21, 1931 |
| 1,829,020 | Shields | Oct. 27, 1931 |
| 1,884,673 | Hayes | Oct. 25, 1932 |
| 2,004,715 | Thwaits | June 11, 1935 |